(No Model.)
J. WINTER.
PUMPING APPARATUS.
No. 582,568. Patented May 11, 1897.
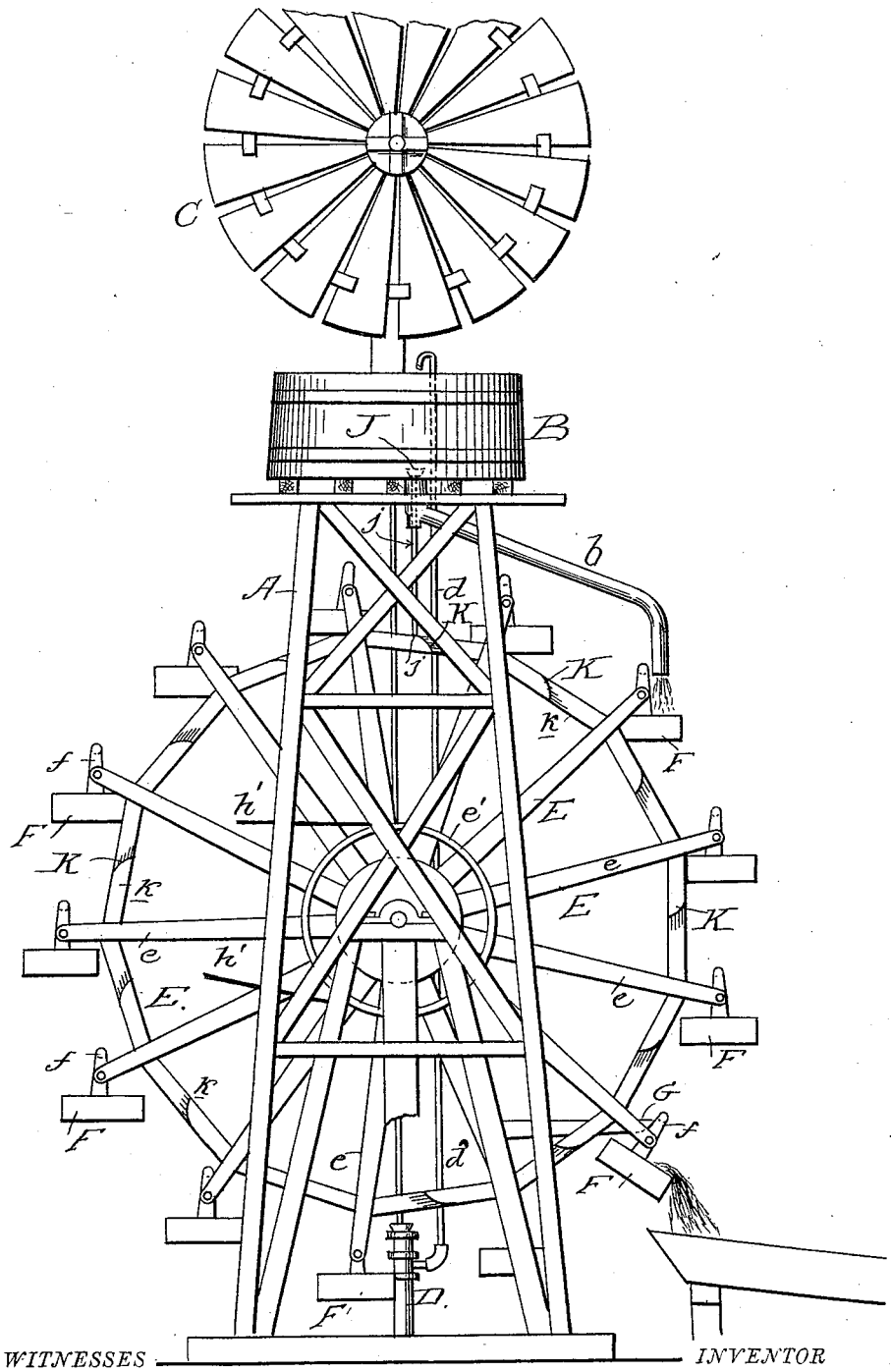
WITNESSES
Chapman W. Fowler
Walter Donaldson
INVENTOR
John Winter
by Dewey & Co
his Attorneys

UNITED STATES PATENT OFFICE.

JOHN WINTER, OF TULARE, CALIFORNIA.

PUMPING APPARATUS.

SPECIFICATION forming part of Letters Patent No. 582,568, dated May 11, 1897.

Application filed May 13, 1896. Serial No. 591,319. (No model.)

*To all whom it may concern:*

Be it known that I, JOHN WINTER, a citizen of the United States, residing at Tulare, county of Tulare, State of California, have invented an Improvement in Pumping Apparatus; and I hereby declare the following to be a full, clear, and exact description of the same.

My invention relates to pumping mechanisms; and it consists in the parts and the construction and combination of parts hereinafter described and claimed.

Referring to the accompanying drawing, the figure is an elevation of my apparatus.

A is a frame supporting upon its top a tank B. Any suitable power device may be employed by which to raise water into said tank—such as a steam or other engine, a windmill, a horse-power, hydraulic ram, or any other available power. For the purposes of illustration merely I have shown a wind-wheel C, of any suitable construction, said wheel being connected, by means of a rod $c$, with a pump D, which is in communication with the source of water below and has a discharge-pipe $d$ extending upwardly to and adapted to deliver the water into the tank B. This is but the ordinary construction of a windmill pump and tank, and by the force of the wind water is elevated into the tank B.

E is a large wheel from the extremities of the radiating arms $e$ of which are pivotally suspended the buckets F, having arms fulcrumed between their ends to the extremities of the arms or spokes. An outlet-pipe $b$ from the tank B is adapted to discharge the water successively into the buckets F, and said buckets as they pass downwardly are tilted at a point below by the contact of their rock-arms $f$ with a fixed stop G, so that the water is spilled out from them and may be conducted by a suitable trough (not here shown) or other conduit to its destination for irrigating or other purposes. It will thus be seen that the water in being conducted to its destination is made to turn the wheel E, and thereby furnish power through the pulley $h$ and band or belt $h'$ for such purposes as may be required.

In order to make the discharge of water from the tank B through the pipe $b$ intermittent and automatic, I have the communication between the tank and the pipe controlled by a valve J, the rod $j$ of which extends downwardly and is adapted to be lifted by the cams K on the connecting-braces $k$, located inside of the outer ends of the spokes $e$ of the wheel E.

In the operation of the device the water lifted by the wind-wheel or other power device in being conducted to its destination is caused, as before stated, to perform the work of turning the wheel E, and the power of the wheel is transmitted through the pulley and belt or band to operate a driven device.

Having thus described my invention, what I claim as new, and desire to secure by Letters Patent, is—

The combination, with a storage-tank, having a discharge-pipe and a valve controlling said discharge and having a vertically-disposed stem, of a wheel contiguous to said tank, having radially-projecting spokes, connecting-braces located inside of the outer ends of the spokes, buckets having arms fulcrumed between their ends to the outer extremities of said spokes, inclined cams on the connecting-braces adapted to contact with the lower end of the valve-stem and automatically open the valve upon the alinement of a preceding bucket with the discharge-pipe, and a fixed stop for acting against the free ends of the bucket-arms and causing the bucket to tilt and discharge their contents.

In witness whereof I have hereunto set my hand.

JOHN WINTER.

Witnesses:
R. H. PARRISH,
W. M. DE WITT.